(12) United States Patent
Izumi et al.

(10) Patent No.: US 10,863,141 B2
(45) Date of Patent: Dec. 8, 2020

(54) VEHICLE MONITOR SYSTEM (71) Applicant: MITSUBA Corporation, Gunma (JP)

(72) Inventors: Sumiyasu Izumi, Gunma (JP); Hitoshi Kurihara, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 16/079,112

(22) PCT Filed: May 23, 2017

(86) PCT No.: PCT/JP2017/019153
§ 371 (c)(1),
(2) Date: Aug. 23, 2018

(87) PCT Pub. No.: WO2017/204203
PCT Pub. Date: Nov. 30, 2017

(65) Prior Publication Data
US 2019/0052843 A1 Feb. 14, 2019

(30) Foreign Application Priority Data

May 25, 2016 (JP) .................. 2016-104473

(51) Int. Cl.
*H04N 7/18* (2006.01)
*B60R 1/00* (2006.01)
(Continued)

(52) U.S. Cl.
CPC .............. *H04N 7/181* (2013.01); *B60R 1/00* (2013.01); *B60R 1/002* (2013.01); *B60R 1/06* (2013.01);
(Continued)

(58) Field of Classification Search
CPC ............................................... B60R 2300/802
See application file for complete search history.

(56) References Cited

U.S. PATENT DOCUMENTS

| 7,466,338 B2 | 12/2008 | Xie |
| 9,242,602 B2 | 1/2016 | Corcoran et al. |

(Continued)

FOREIGN PATENT DOCUMENTS

| EP | 1647447 | 4/2006 |
| JP | 2001055100 | 2/2001 |

(Continued)

OTHER PUBLICATIONS

"International Preliminary Report on Patentability of PCT/JP2017/019153", this report contains the following items: Form PCT/IB/373, PCT/ISA237(cover sheet), PCT/ISA237(Box No. 1), and PCT/ISA237(Box No. V), dated Nov. 27, 2018, which is English translation of "Written Opinion of the International Searching Authority", pp. 1-12.

(Continued)

*Primary Examiner* — Phi Hoang
(74) *Attorney, Agent, or Firm* — JCIPRNET (57) ABSTRACT

A vehicle monitor system includes: a detection unit that detects a vehicle located on the rear lateral side of a host vehicle; a rear lateral imaging unit that images a prescribed angle range on the rear lateral side of the host vehicle; a display unit that displays an image captured by the rear lateral imaging unit; and an image processor that extracts a first image in a range of a first angle with reference to a rear side of the host vehicle from the captured image, and displays the extracted first image on the display unit, wherein when the vehicle is detected by the detection unit, the image processor extracts the first image and a second image in a range of a second angle greater than the first angle with reference to the rear side from the captured image, and displays the first and second images on the display unit.

5 Claims, 9 Drawing Sheets (51) Int. Cl.
*H04N 5/225* (2006.01)
*G06K 9/00* (2006.01)
*G08G 1/16* (2006.01)
*B60R 1/06* (2006.01)
*B60R 1/12* (2006.01)

(52) U.S. Cl.
CPC ............ *B60R 1/12* (2013.01); *G06K 9/00791* (2013.01); *G06K 9/00825* (2013.01); *G08G 1/166* (2013.01); *G08G 1/167* (2013.01); *H04N 5/2253* (2013.01); *H04N 5/2257* (2013.01); *H04N 7/18* (2013.01); *B60R 2001/1253* (2013.01); *B60R 2300/303* (2013.01); *B60R 2300/802* (2013.01); *B60R 2300/8026* (2013.01); *B60R 2300/8066* (2013.01)

(56) References Cited

U.S. PATENT DOCUMENTS

| | | | | |
|---|---|---|---|---|
| 9,487,139 | B1* | 11/2016 | Ishida | B60Q 9/008 |
| 2007/0030212 | A1* | 2/2007 | Shibata | G08G 1/162 |
| | | | | 345/9 |
| 2008/0007428 | A1* | 1/2008 | Watanabe | B60R 1/00 |
| | | | | 340/901 |
| 2008/0106389 | A1* | 5/2008 | Desai | B60R 1/1207 |
| | | | | 340/425.5 |
| 2009/0079553 | A1* | 3/2009 | Yanagi | B60R 1/00 |
| | | | | 340/435 |
| 2010/0225762 | A1 | 9/2010 | Augst | |
| 2012/0154591 | A1* | 6/2012 | Baur | B60R 1/00 |
| | | | | 348/148 |
| 2015/0232028 | A1* | 8/2015 | Reardon | B60R 1/12 |
| | | | | 348/148 |
| 2016/0073031 | A1* | 3/2016 | Watanabe | H04N 5/23293 |
| | | | | 345/7 |
| 2016/0148062 | A1* | 5/2016 | Fursich | H04N 13/239 |
| | | | | 348/36 |

FOREIGN PATENT DOCUMENTS

| | | |
|---|---|---|
| JP | 2004312523 | 11/2004 |
| JP | 2005328181 | 11/2005 |
| JP | 2008015759 | 1/2008 |
| JP | 2008018760 | 1/2008 |
| JP | 2010018232 | 1/2010 |

OTHER PUBLICATIONS

"International Search Report (Form PCT/ISA/210)" of PCT/JP2017/0191533, dated Aug. 15, 2017, with English translation thereof, pp. 1-4.

"Search Report of Europe Counterpart Application", dated Oct. 31, 2019, p. 1-p. 6.

* cited by examiner

VEHICLE MONITOR SYSTEM

CROSS-REFERENCE TO RELATED APPLICATION

This application is a 371 of international application of PCT application serial no. PCT/JP2017/019153, filed on May 23, 2017, which claims the priority benefit of Japan application no. 2016-104473, filed on May 25, 2016. The entirety of each of the abovementioned patent applications is hereby incorporated by reference herein and made a part of this specification.

BACKGROUND OF THE INVENTION

Technical Field

The present invention relates to a vehicle monitor system.

Related Art

In the past, in order to reduce blind angles of a driver driving a vehicle, a side mirror is mounted on an upper section of a front door of the vehicle so that a lateral area of the vehicle can be reflected. Besides, the driver can improve visibility of the rear and of a following vehicle by turning the side mirror toward the outside of the host vehicle.

LITERATURE OF RELATED ART

[Patent Literature]
Patent literature 1: Japanese Laid-open No. 2010-18232

SUMMARY

Problems to be Solved by the Invention

However, when a side mirror is directed to the outside of the host vehicle, a lateral surface of the host vehicle cannot be reflected in the side mirror. As a result, there is possibility that a position of a following vehicle relative to the host vehicle is hard to be perceived, and operations such as lane change cannot be safely performed.

The present invention provides, based on such circumstances, a vehicle monitor system capable of perceiving a position of a following vehicle relative to a host vehicle while ensuring visibility of the rear and of the following vehicle.

Means to Solve the Problems

One embodiment of the present invention is a vehicle monitor system, which includes: a detection unit that detects a vehicle located on a rear lateral side of a host vehicle, a rear lateral imaging unit that images a prescribed angle range on the rear lateral side of the host vehicle, a display unit that is provided inside the host vehicle and displays an image captured by the rear lateral imaging unit, and an image processor that extracts a first image in a range of a first angle with reference to a rear side of the host vehicle from the images of the prescribed angle range captured by the rear lateral imaging unit, and displays the extracted first image on the display unit, wherein when the vehicle is detected by the detection unit, the image processor extracts the first image and a second image in a range of a second angle greater than the first angle with reference to the rear side from the image of the prescribed angle range, and displays the first image and the second image on the display unit.

In addition, one embodiment of the present invention is the vehicle monitor system, in which the image processor displays the second image on the display unit so as to be continuous with the first image when the vehicle is detected by the detection unit.

In addition, one embodiment of the present invention is the vehicle monitor system, in which the first image and the second image are images on the same scale.

In addition, one embodiment of the present invention is the vehicle monitor system, in which the display unit includes a first display area for displaying the first image and a second display area for displaying the second image, and the display unit causes the second display area to be displayed in a display mode different from the display mode of the first display area when the vehicle is detected by the detection unit.

In addition, one embodiment of the present invention is the vehicle monitor system, in which the rear lateral imaging unit is provided on a side mirror mounted on the host vehicle, the first angle is a range of a same viewing angle as the side mirror, and the second angle at least includes a range of a blind angle of the side mirror.

In addition, one embodiment of the present invention is the vehicle monitor system, in which when the vehicle is detected by the detection unit, the image processor calculates a relative position of the vehicle to the host vehicle, from the image of the prescribed angle range captured by the rear lateral imaging unit, and determines the second angle based on the calculated relative position.

In addition, one embodiment of the present invention is the vehicle monitor system, in which the display unit is provided on a center panel of the host vehicle.

In addition, one embodiment of the present invention is the vehicle monitor system, in which the image processor displays an image of the rear lateral side and an image of the rear side on the display unit so that the image of the rear lateral side and the image of the rear side are continuous.

Effect of the Invention

As described above, according to the present invention, a vehicle monitor system capable of perceiving a position of a following vehicle relative to a host vehicle while ensuring visibility of the following vehicle can be provided.

DESCRIPTION OF THE EMBODIMENTS

The present invention is described below by embodiments of the invention, but the inventions in the claims are not limited to the following embodiments. Besides, not all combinations of features described according to the embodiments are necessary for solutions of the invention. Furthermore, there are cases that the same or similar part is marked with the same symbol in the drawings to omit repeated descriptions.

A vehicle monitor system according to an embodiment is mounted on a vehicle, cuts a first image corresponding to a side mirror from a wide-angle image of a rear lateral side of a host vehicle captured by a rear lateral imaging unit, and displays the cut first image on a display unit inside the host vehicle. Besides, when a following vehicle approaches from an adjacent lane, the vehicle monitor system cuts a second image in a range which is a blind angle of a side mirror from the wide-angle image, and displays the cut second image on the display unit so as to be continuous with the first image. Accordingly, it is possible to perceive the position of the following vehicle relative to the host vehicle while ensuring visibility of the following vehicle.

The vehicle monitor system of the embodiment is described below using the drawings.

Figure 1:
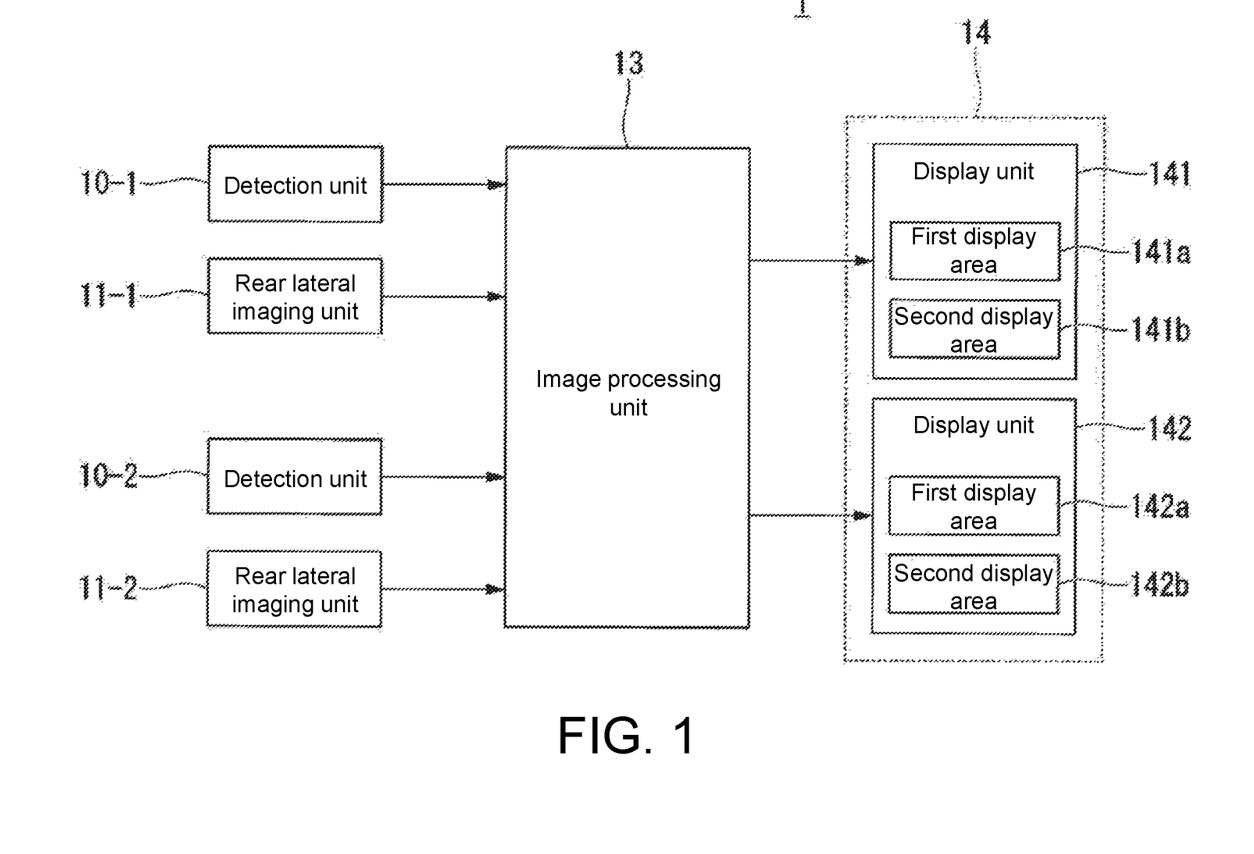
FIG. 1 is a drawing showing an example of a schematic configuration of a vehicle monitor system 1 according to the embodiment.

FIG. 1 is a drawing showing an example of a schematic configuration of a vehicle monitor system 1 according to the embodiment. As shown in FIG. 1, the vehicle monitor system 1 includes detection units 10 (detection units 10-1, 10-2), rear lateral imaging units 11 (rear lateral imaging units 11-1, 11-2), an image processor 13 and display devices 14 (display units 141, 142).

Figure 2:
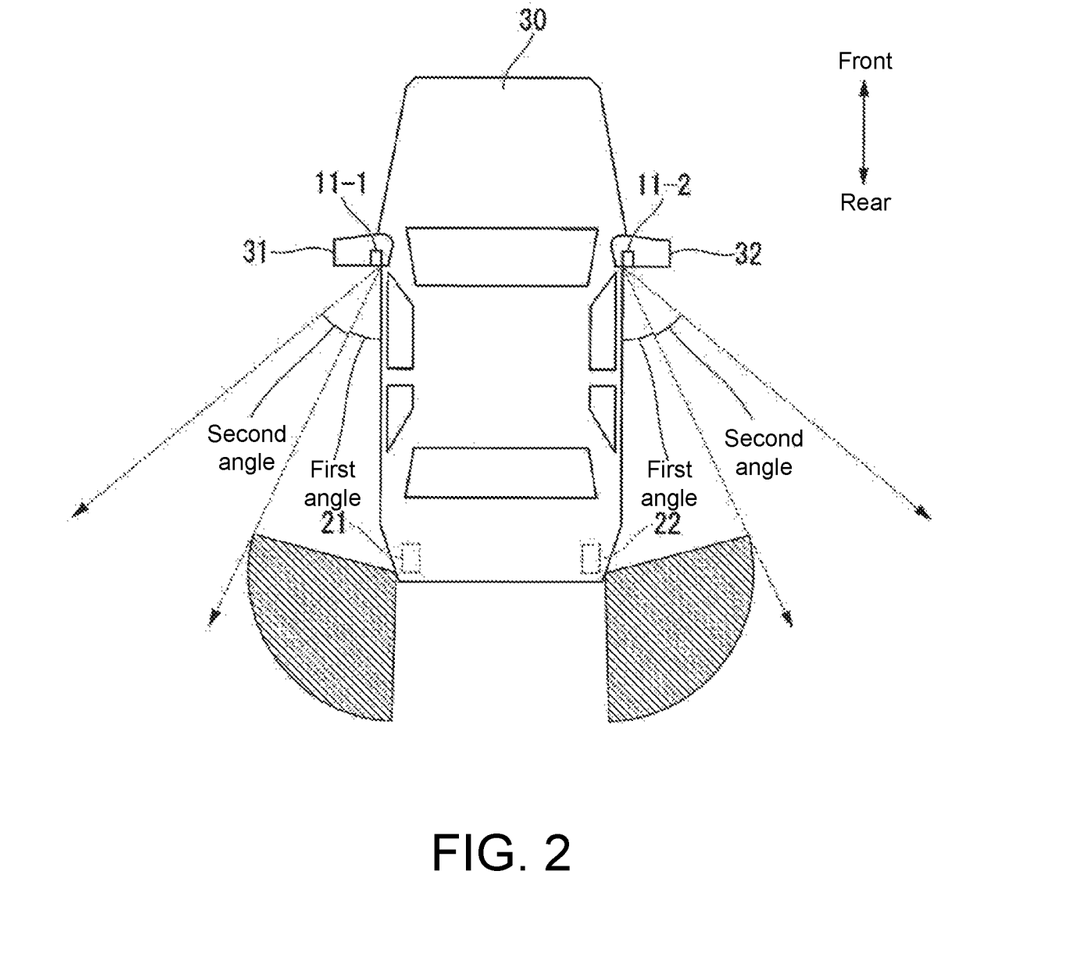
FIG. 2 is a drawing showing an imaging range of a rear lateral imaging unit 11 according to the embodiment.

The rear lateral imaging units 11 (the rear lateral imaging units 11-1, 11-2) image a prescribed angle range on the rear lateral side of a vehicle 30. FIG. 2 is a drawing showing an imaging range of the rear lateral imaging units 11 according to the embodiment.

As shown in FIG. 2, for example, the rear lateral imaging unit 11-1 is a wide-angle lens camera and is arranged on a side mirror 31 on the left side of the vehicle 30. And, the rear lateral imaging unit 11-1 images a prescribed angle range on the left rear side of the vehicle 30. For example, the prescribed angle range captured by the rear lateral imaging unit 11-1 has an area including a left adjacent lane. Specifically, as shown in FIG. 2, the rear lateral imaging unit 11-1 images an area including a range of the first angle which is the same range of the viewing angle range of the side mirror 31, and a range of the second angle which is a range of a blind angle of the side mirror 31. The range of the first angle is, for example, an angle range up to 30 degrees with reference to the rear of the vehicle 30. The second angle range is, for example, an angle range up to 30 degrees with reference to the first angle. Therefore, for example, the rear lateral imaging unit 11-1 images a range of an angle up to 60 degrees with reference to the left rear side of the vehicle 30. The rear lateral imaging unit 11-1 outputs the captured image to the image processor 13. Here, the angle range of, for example, 30 degrees with respect to the rear as the range of the first angle means, as shown in FIG. 2, an angle range extended from a side surface of the host vehicle by a prescribed angle (here, 30 degrees) laterally in a direction away from the host vehicle from the side surface with the side mirrors 31, 32 as base points. Besides, in a viewpoint of the driver, this angle range has the same meaning as the rear and rear lateral side images which are reflected by the side mirrors 31, 32 and which can be confirmed by the driver.

For example, the rear lateral imaging unit 11-2 is a wide-angle lens camera and is arranged on the side mirror 32 on the right side of the vehicle 30. And, the rear lateral imaging unit 11-2 images a prescribed angle range on the right rear side of the vehicle 30. For example, the prescribed angle range captured by the rear lateral imaging unit 11-2 has an area including a right adjacent lane. Specifically, as shown in FIG. 2, the rear lateral imaging unit 11-2 images an area including a range of the first angle which is the same range of the viewing angle of the side mirror 32, and a range of the second angle which is a range of a blind angle of the side mirror 32. For example, the rear lateral imaging unit 11-2 images the angle range up to 60 degrees on the right rear side with reference to the right rear side of the vehicle 30. The rear lateral imaging unit 11-2 outputs the captured image to the image processor 13. Furthermore, by using an infrared camera, a high sensitivity camera, or a camera that can deal with shadow or darkness as the rear lateral imaging unit 11, a good image view can be obtained even at night.

The detection units 10 (the detection units 10-1, 10-2) are mounted on the rear of the vehicle 30, and detect the following vehicle located on the rear lateral side of the vehicle 30. The detection unit 10-1 detects the following vehicle on the left rear side. The detection unit 10-2 detects the following vehicle on the right rear side. For example, the detection units 10 (the detection units 10-1, 10-2) use a millimeter-wave radar to detect the following vehicle located on the rear lateral side. However, as long as the detection unit 10 can detect the following vehicle located on the rear lateral side of the vehicle 30, the detection method is not specifically restricted. For example, the detection units 10 can detect the following vehicle located on the rear lateral side of the vehicle 30 by using a BSD (Blind Spot Detection) system, a LCA (Lane Change Alert) system, or a RCTA (Rear Cross Traffic Alert) which detects the following vehicle by a millimeter-wave radar, and by using a function for recognizing a relative distance between the host vehicle and an object captured by the camera by the image processor 13, or the detection units 10 can detect the following vehicle by a laser radar. The following vehicle located on the rear lateral side is, for example, the following vehicle located at the second angle in the left and right adjacent lanes. That is, for example, the detection unit 10-1 detects the vehicle which is located in a range of the second angle (or which enters the range of the second angle) on the left side that is the blind angle of the side mirror 31. The detection unit 10-2 detects the vehicle which is located in the range of the second angle (or which enters the range of the second angle) on the right side that is the blind angle of the side mirror 32. When the following vehicle located on the rear lateral side of the vehicle 30 is detected, the detection units 10-1, 10-2 respectively output detection signals showing the detection of the following vehicle to the image processor 13. Furthermore, for the sake of security, the detection units 10 may also detect the following vehicle located at the first angle in the left and right adjacent lanes and output the detection signals showing the detection of the following vehicle to the image processor 13. That is, the detection unit 10 may also detect the following vehicle before the following vehicle enters the blind angle of the side mirror 32 and output the detection signal showing the detection of the following vehicle to the image processor 13.

The image processor 13 extracts the first image which is an image corresponding to the range of the first angle from the image captured by the rear lateral imaging unit 11-1. Then, the image processor 13 displays the first image extracted from the image captured by the rear lateral imaging unit 11-1 on the display unit 141.

However, when the detection signal is output from the detection unit 10-1, the image processor 13 extracts the second image which includes at least the range of the second angle greater than the range of the first angle from the image captured by the rear lateral imaging unit 11-1. Then, the image processor 13 displays the extracted first and second images on the display unit 141. In this case, for example, the image processor 13 displays the second image on the display unit 141 so as to be continuous with the first image. Accordingly, the driver is capable of perceiving the position of the following vehicle relative to the vehicle 30 while ensuring visibility of the following vehicle by checking the display unit 141. Here, the range of the second angle greater than the first angle refers to the angle range which expands more to the lateral of the direction away from the host vehicle than the first angle range. Observed from the driver, the left-side second image is displayed on the left side of the left-side first image.

The image processor 13 extracts the first image which is an image corresponding to the range of the first angle from the image captured by the rear lateral imaging unit 11-2. Then, the image processor 13 displays the first image extracted from the image captured by the rear lateral imaging unit 11-2 on the display unit 142.

However, when the detection signal is output from the detection unit 10-2, the image processor 13 extracts the second image which at least includes the range of the second angle greater than the first angle from the image captured by the rear lateral imaging unit 11-2. Then, the image processor 13 displays the extracted first and second images on the display unit 142. In this case, the image processor 13 displays the second image on the display unit 142 so as to be continuous with the first image. Observed from the driver, the right-side second image is displayed on the right side of the right-side first image.

Furthermore, each section of the image processor 13 can be achieved by hardware, software or a combination of hardware and software.

The display unit 141 is arranged in the interior of the vehicle 30. The display unit 141 displays the image captured by the rear lateral imaging unit 11-1. The display unit 142 is arranged in the interior of the vehicle 30. The display unit 142 displays the image captured by the rear lateral imaging unit 11-2.

The display unit 141 includes a first display area 141a for displaying the first image, and a second display area 141b for displaying the second image. The display unit 142 includes a first display area 142a for displaying the first image, and a second display area 142b for displaying the second image. Furthermore, the display units 141, 142 may be separated from each other, or be configured as one display unit.

Display screens of the first display area 142a and the second display area 142b of the display unit 142 according to the embodiment are described below using FIG. 3 to FIG. 6. Furthermore, the display screen of the first display area 141a and the second display area 141b with the display screen of the first display area 142a and the second display area 142b are different only in the images to be displayed on the left and right of the vehicle 30, and the display contents are the same. Therefore, description about the display screens of the first display area 141a and the second display area 141b is omitted.

Figure 3:
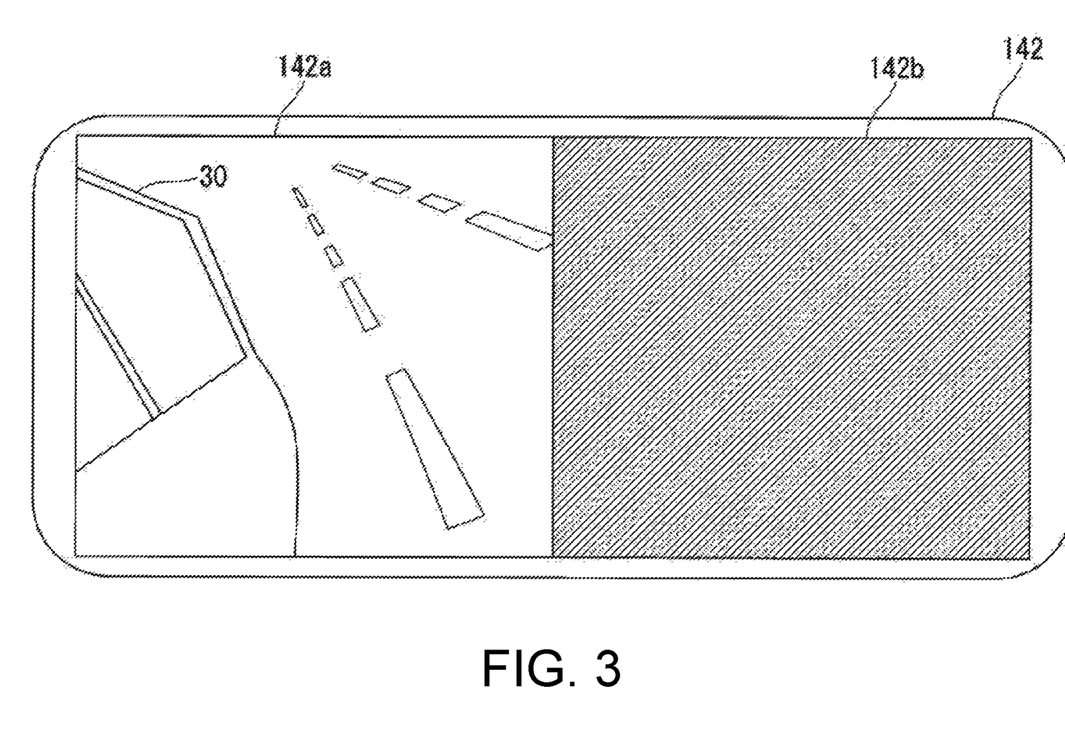
FIG. 3 is a drawing showing a display screen of a display unit 142 when a following vehicle is not located on the right rear side of a vehicle 30 according to the embodiment.

FIG. 3 is a drawing showing the display screen of the display unit 142 when the following vehicle is not located on the right rear side of the vehicle 30. As shown in FIG. 3, the following vehicle is not located in the first angle or the second angle on the right rear side of the vehicle 30, and thus the detection unit 10-2 does not output the detection signal. Therefore, the display unit 142 displays a first image in the image captured by the rear lateral imaging unit 11-2 on the first display area 142a. And, the display unit 142 does not display the image captured by the rear lateral imaging unit 11-2 on the second display area 142b. For example, the display unit 142 can black out the second display area 142b, make the second display area 142b blue screen, include an indicator function for informing the driver of the existence of the following vehicle, or display guidance information such as road traffic information. In this way, when the following vehicle is not located in the blind angle of the side mirror 32, the display unit 142 displays the same range as the viewing angle of the side mirror 32 only on the first display area 142a.

Figure 4:
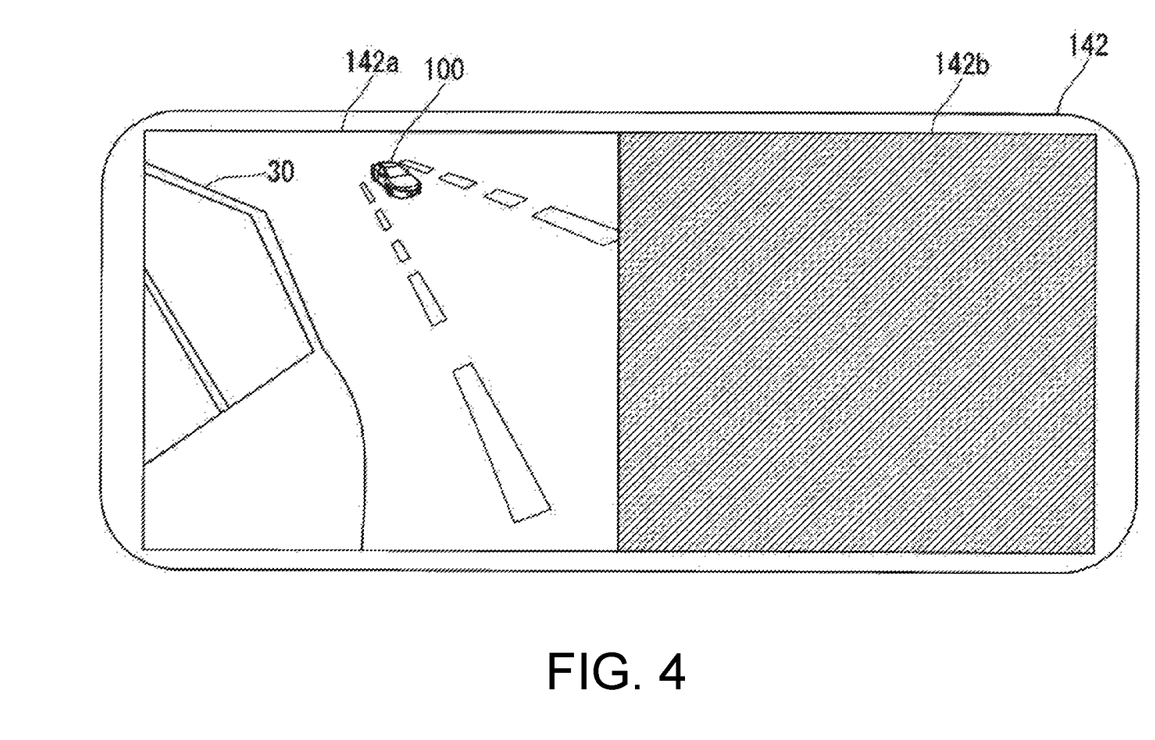
FIG. 4 is a drawing showing a display screen of the display unit 142 when a following vehicle 100 is located on the right rear side of and far from the vehicle 30 according to the embodiment.

FIG. 4 is a drawing showing a display screen of the display unit 142 when a following vehicle 100 is presented far from the right rear side of the vehicle 30. The following vehicle 100 shown in FIG. 4 is presented far from the right rear side of the vehicle 30, and there is no safety problem even if the vehicle 30 changes to the adjacent lane on the right. In this case, the detection unit 10-2 does not output the detection signal. Similar to FIG. 3, the display unit 142 displays the first image in the image captured by the rear lateral imaging unit 11-2 on the first display area 142a. And, the display unit 142 does not display the image captured by the rear lateral imaging unit 11-2 on the second display area 142b.

Figure 5:
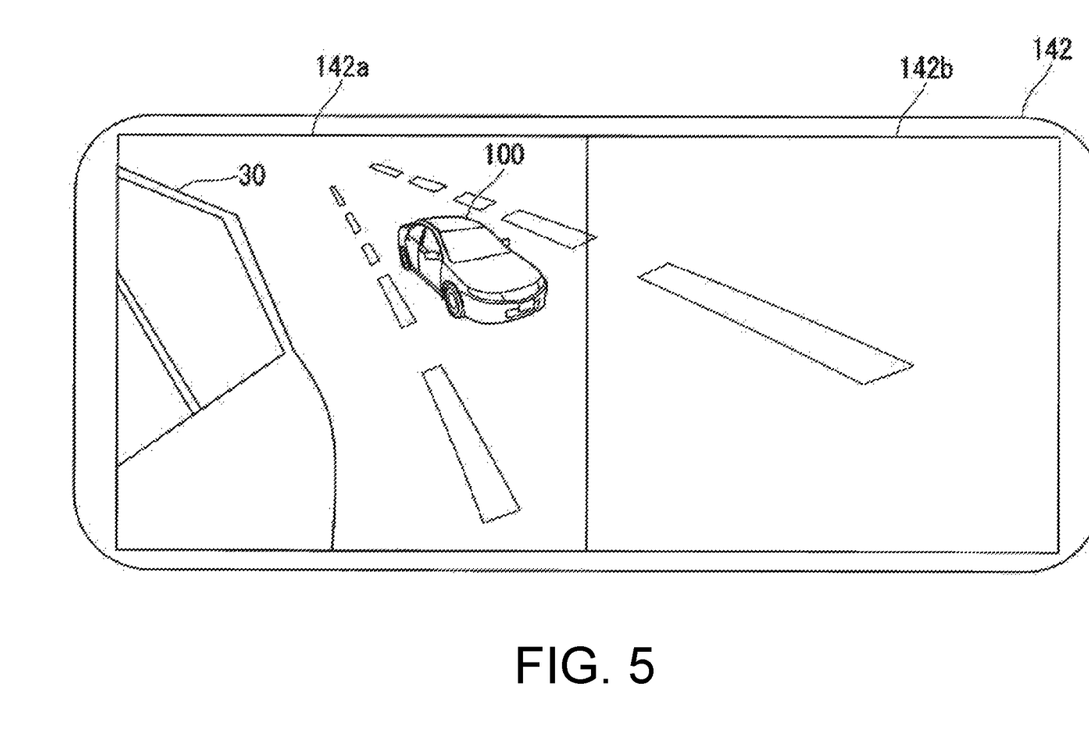
FIG. 5 is a drawing showing a display screen of the display unit 142 when the following vehicle 100 is located on the right rear side of the vehicle 30 according to the embodiment.

FIG. 5 is a drawing showing a display screen of the display unit 142 when the following vehicle 100 is located on the right rear side of the vehicle 30. As shown in FIG. 5, the following vehicle 100 is located on the right rear side of the vehicle 30 (for example, the following vehicle 100 is located in the range of the first angle), and thus the detection unit 10-2 detects an existence of the following vehicle 100 and outputs the detection signal to the image processor 13. And, when the detection signal is obtained from the detection unit 10-2, the image processor 13 extracts the second image in the image captured by the rear lateral imaging unit 11-2, and outputs the extracted second image on the display unit 142. Accordingly, the display unit 142 displays the first image in the image captured by the rear lateral imaging unit 11-2 on the first display area 141a, and displays the second image on the second display area 142b. In the embodiment, the display unit 142 displays the second image on the second display area 142b so as to be continuous with the first image. And the first and second images are images with the same scale. That is, when the following vehicle 100 is located on the right rear side of the vehicle 30, the display unit 142 keeps the scale of the displayed image and expands the viewing angle. Accordingly, the driver can keep a sense of distance of the following vehicle 100 relative to the vehicle. In this way, when the following vehicle 100 is located on the right rear side of the vehicle 30, the display unit 142 displays the first image on the first display area 142a and displays the range of the blind angle of the side mirror 32 on the second display area 142b.

Figure 6:
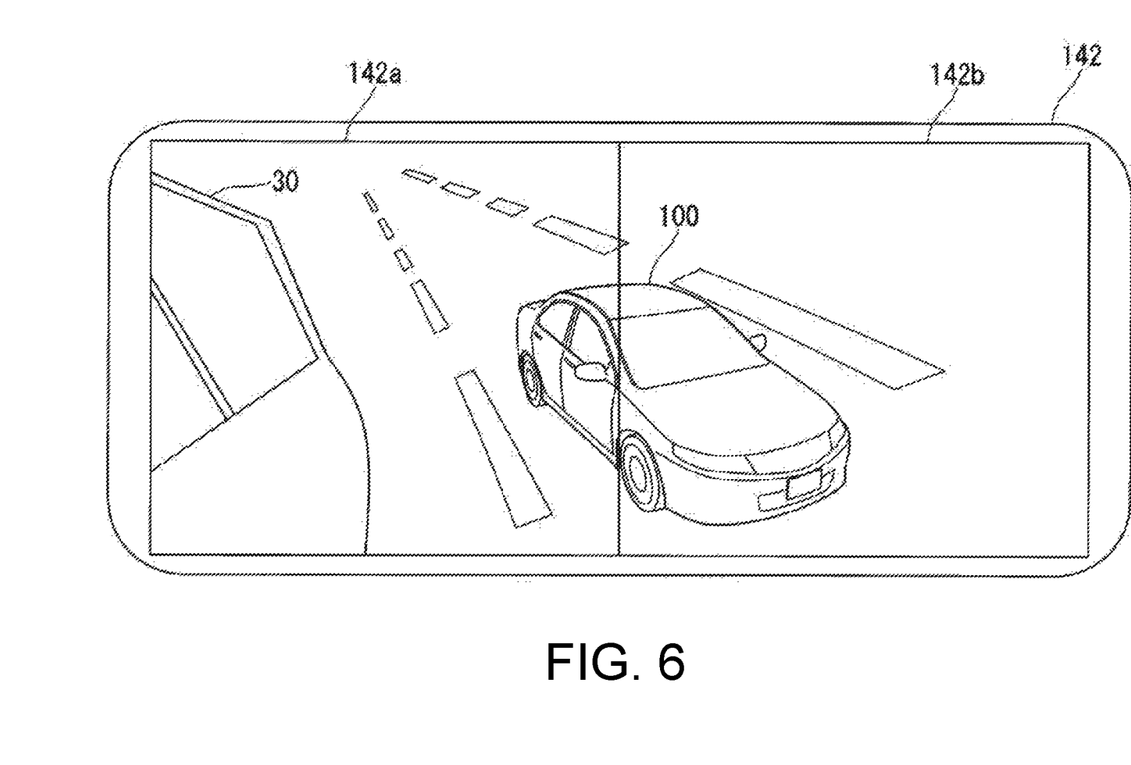
FIG. 6 is a drawing showing a display screen of the display unit 142 when the following vehicle 100 is located on the right rear side of the vehicle 30 according to the embodiment.

FIG. 6 is a drawing showing a display screen of the display unit 142 when the following vehicle 100 is located on the right rear side of the vehicle 30. As shown in FIG. 6, the following vehicle 100 is located on the right rear side of the vehicle 30, and enters the range of the second angle. Therefore, the detection unit 10-2 continues to output the detection signal to the image processor 13. Accordingly, the display unit 142 displays the first image in the image captured by the rear lateral imaging unit 11-2 on the first display area 141a, and displays the second image on the second display area 142b. That is, when the following vehicle enters the range which originally is the blind angle of the driver (the blind angle of the side mirror 32), the display unit 142 displays the first image on the first display area 142a, and displays the image in the range of the blind angle of the side mirror 32 in which the following vehicle 100 is located on the second display area 142b. Accordingly, the driver can perceive the existence of the following vehicle 100 which enters the blind angle of the side mirror 32 by checking the second display area 142b. Besides, as shown in FIG. 6, according to the embodiment, the display unit 142 displays the second image on the second display area 142b to be continuous with the first image including the vehicle 30. Accordingly, the position of the following vehicle relative to the vehicle 30 is capable of being perceived while visibility of the following vehicle 100 is ensured.

Furthermore, when the output of the detection signal from the detection unit 10-2 is stopped, the display unit 142 stops the display of the second image on the second display area 142b, blacks out the second display area 142b, makes the second display area 142b blue screen, displays the indicator function, or displays guidance information such as road traffic information. Accordingly, the display of unnecessary second image is reduced, and the bother to the driver is lowered. The state that the output of the detection signal from the detection unit 10-2 is stopped refers to a state that the following vehicle 100 goes out of the detection range of the detection unit 10-2. Here, the bother to the driver refers to a feeling of strangeness felt by the driver caused by a speed difference in transition of the captured images (captured scenes) reflected in the first image and the second image. In general, the transition speed of the image reflected in one display area becomes faster toward the lateral side of the direction away from the vehicle.

Figure 7:
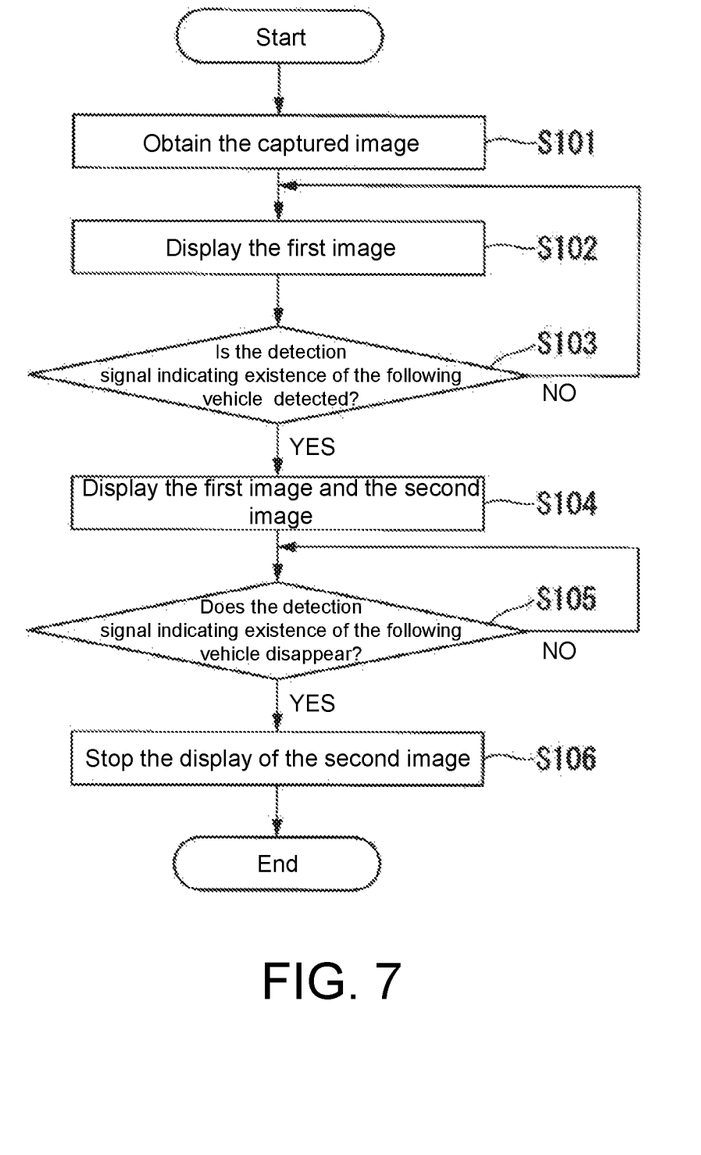
FIG. 7 is a drawing illustrating a processing flow of an image processor 13 according to the embodiment.

A processing flow of the image processor 13 according to the embodiment is described below. FIG. 7 is a drawing illustrating the processing flow of the image processor 13 according to the embodiment. Furthermore, as an initial condition, a case where the following vehicle 100 is not located on the rear lateral side of the vehicle 30 is described as an example.

The image processor 13 obtains the image captured by the rear lateral imaging unit 11 (step S101). The image processor 13 extracts the first image which is an image corresponding to the first angle range from the image captured by the rear lateral imaging unit 11. Then, the image processor 13 displays the first image extracted from the image captured by the rear lateral imaging unit 11 on the display device 14 (step S102). For example, the image processor 13 extracts the first image which is the image corresponding to the first angle range from the image captured by the rear lateral imaging unit 11. Then, the image processor 13 displays the first image extracted from the image captured by the rear lateral imaging unit 11-1 on the first display area 141a of the display unit 141. The image processor 13 extracts the first image which is an image corresponding to the first angle range from the image captured by the rear lateral imaging unit 11-2. Then, the image processor 13 displays the first image extracted from the image captured by the rear lateral imaging unit 11-2 on the first display area 142a of the display unit 142. In this case, the image processor 13 may black out the second display areas 141b, 142b, make the second display areas 141b, 142b blue screen, have the indicator function of informing the driver of the existence of the following vehicle, or display the guidance information such as road traffic information.

The image processor 13 judges whether the detection signal is obtained from the detection unit 10 (step S103). When the detection signal is obtained from the detection unit 10, the image processor 13 extracts the first image and the second image of the second angle range from the image captured by the rear lateral imaging unit 11, and displays the first image and the second image on the display device 14 (step S104). For example, when the detection signal is obtained from the detection unit 10-1, the image processor 13 extracts the second image from the image captured by the rear lateral imaging unit 11-1. Then, the image processor 13 displays the first image on the first display area 141a, and displays the second image on the second display area 141b. When the detection signal is obtained from the detection unit 10-2, the image processor 13 extracts the second image from the image captured by the rear lateral imaging unit 11-2. Then, the image processor 13 displays the first image on the first display area 142a and displays the second image on the second display area 142b. Furthermore, when the detection signal is not obtained from the detection unit 10, the image processor 13 conducts the process of step S102.

The image processor 13 judges whether the detection signal output from the detection unit 10 disappears (step S105). When the detection signal output from the detection unit 10 disappears, the image processor 13 stops the display of the second image (step S106). For example, When the detection signal output from the detection unit 10-1 disappears, the image processor 13 stops the display of the second image on the second display area 141b, and blacks out the second display area 141b, makes the second display area 141b blue screen, displays the indicator function, or displays guidance information such as road traffic information. When the detection signal output from the detection unit 10-2 disappears, the image processor 13 stops the display of the second image on the second display area 142b, and blacks out the second display area 142b, makes the second display area 142b blue screen, includes the indicator function, or displays guidance information such as road traffic information. Furthermore, when the detection signal output from the detection unit 10 does not disappear, the image processor 13 conducts a process of step S105.

As described above, the vehicle monitor system 1 according to the embodiment includes the detection unit 10 that detects the vehicle located on the rear lateral side of the host vehicle, the rear lateral imaging unit 11 that images a prescribed angle range on the rear lateral side of the host vehicle, the display units 141, 142 that are provided inside the host vehicle and display the image captured by the rear lateral imaging unit 11, and the image processor 13 that extracts the first image of the first angle range with reference to a rear side of the host vehicle from the image of the prescribed angle range captured by the rear lateral imaging unit 11, and that displays the extracted first image on the display units 141, 142. And, when the vehicle is detected by the detection unit 10, the image processor extracts the first image and the second image, which is an image of a range of the second angle greater than the first angle with reference to the rear side from the image of the prescribed angle range, and displays the first and second images on the display units 141, 142. Accordingly, the driver of the vehicle 30 can perceive a position of the following vehicle 100 relative to the vehicle 30 which is a host vehicle while ensuring visibility of the following vehicle 100 by checking the display units 141, 142. Therefore, the driver can safely conduct operations like lane changes.

In addition, as described above, the display device 14 displays the image with the same viewing angle as the side mirror on the first display area. Accordingly, the feeling of strangeness felt by the driver (for example, a difference in vision due to a mirror mounted on the conventional side mirror and the image and a speed sense) can be reduced. Besides, the display device 14 displays the second image on the second display area so as to be continuous with the first image. Accordingly, since the host vehicle can be displayed in the first image of the first display area, the driver can perceive a position of the following vehicle 100 relative to the vehicle 30 which is a host vehicle more easily. The viewing angle of the side mirror here refers to a visual range reflected in the side mirror that can be checked by the driver, and in the first display area, the image with the same viewing angle as the side mirror is displayed. Besides, the viewing angle of the side mirror is usually set to (at least) 25 degrees to 30 degrees, but the viewing angle is set optionally according to the vehicle. Besides, the first and second display areas can be arbitrarily moved in the direction of display like a conventional side mirror.

In addition, as described above, the display device 14 displays the first and second images as images of the same scale. That is, when the following vehicle 100 is located on the right rear side of the vehicle 30, the display unit 142 keeps the scale of the display image and expands the viewing angle. Accordingly, even when the second image is displayed in the second display area, the display device 14 can cause the host vehicle to be displayed on the first image of the first display area, and can keep a reduction scale and a sense of perspective of an image reflected in the first image of the first display area and the second image of the second display area unchanged. Therefore, a distortion and a feeling of strangeness of the displayed image can be eliminated and a distance sense of the following vehicle 100 relative to the vehicle 30 can be kept. Besides, a displayed subject becomes smaller when an expansion of the viewing angle is displayed on one display area; however, multiple display areas including the first display area and the second display area are provided in the present invention so that the first image and the second image can be set to the same scale.

In addition, in the above embodiment, when the following vehicle is not located on the right rear side of the vehicle 30, the display device 14 displays the first image only on the first display area, but it is not limited thereto. For example, as long as the bother to the driver can be reduced by setting the brightness or saturation of the second display area sufficiently lower than the first display area, the display device 14 can also display the second image on the second display area. Besides, by arranging a switch that allows the driver to optionally select the display ON-OFF of the second display area, the second image can also be displayed constantly on the second display area.

In addition, in the above embodiment, when the following vehicle is located right on the rear lateral side of the vehicle 30 (the detection signal is obtained), the display device 14 can also make the second display area blink. Accordingly, the driver can perceive that the following vehicle approaches from the adjacent lane. Besides, a sound producing unit may be further provided in the vehicle monitor system 1, and when the following vehicle is located on the right rear side of the vehicle 30 (the detection signal is obtained), the driver can also be informed of the approach of the following vehicle by the output of warning sounds or voice. Besides, the following vehicle can also be displayed in an enlarged way by displaying the second image as an enlarged image. Besides, an indicator lamp and so on may be blinked by an indicator function of informing the driver of the existence of the following vehicle. That is, the display device 14 can also inform the driver of the approach of the following vehicle by displaying the second display area with a display mode different from the display mode of the first display area, and the display mode is not limited.

In addition, in the above embodiment, when the following vehicle 100 is detected by the detection unit 10, the image processor 13 may calculate the relative position of the following vehicle 100 with respect to the vehicle 30 from the image of the prescribed angle range captured by the rear lateral imaging unit 11. Then, the image processor 13 may determine the second angle range based on the calculated relative position. Besides, the following vehicle 100 located on the rear lateral side of the vehicle 30 can also be detected by using functions of recognizing and calculating, by the image processor 13, a relative position (a relative distance) between the vehicle 30 and the following vehicle 100 captured by the rear lateral imaging unit 11. That is, the functions of the detection unit 10 may be carried out by the rear lateral imaging unit 11 and the image processor 13.

In addition, in the above embodiment, the image processor 13 may determine the second angle range according to a relative speed of the following vehicle 100.

In addition, in the above embodiment, a switch which causes the second image to be displayed on the second display area may be further arranged on the vehicle monitor system 1. Accordingly, users can check the second angle image at a desired timing.

In addition, in the above embodiment, the image processor 13 may display the second image on the second display area when a steering of the vehicle 30 rotates more than a prescribed angle. The state that the steering of the vehicle 30 rotates more than the prescribed angle refers to a state that the driver changes the lane of the vehicle 30 to the adjacent lane. Accordingly, when changing the lane of the vehicle 30 to the adjacent lane, the driver can more safely change lanes of the vehicle 30 while checking the second image displayed on the second display area. Besides, the second image may be displayed on the second display area when an operation of a direction indicator is detected, or when both the operation of the direction indicator and the steering action are detected.

In addition, in the above embodiment, the display device 14 may be arranged on a center panel of the vehicle 30. Accordingly, while the vehicle 30 is traveling, the blind angle of the side mirrors 31, 32 can be checked without sacrificing the driver's front view.

Figure 8:
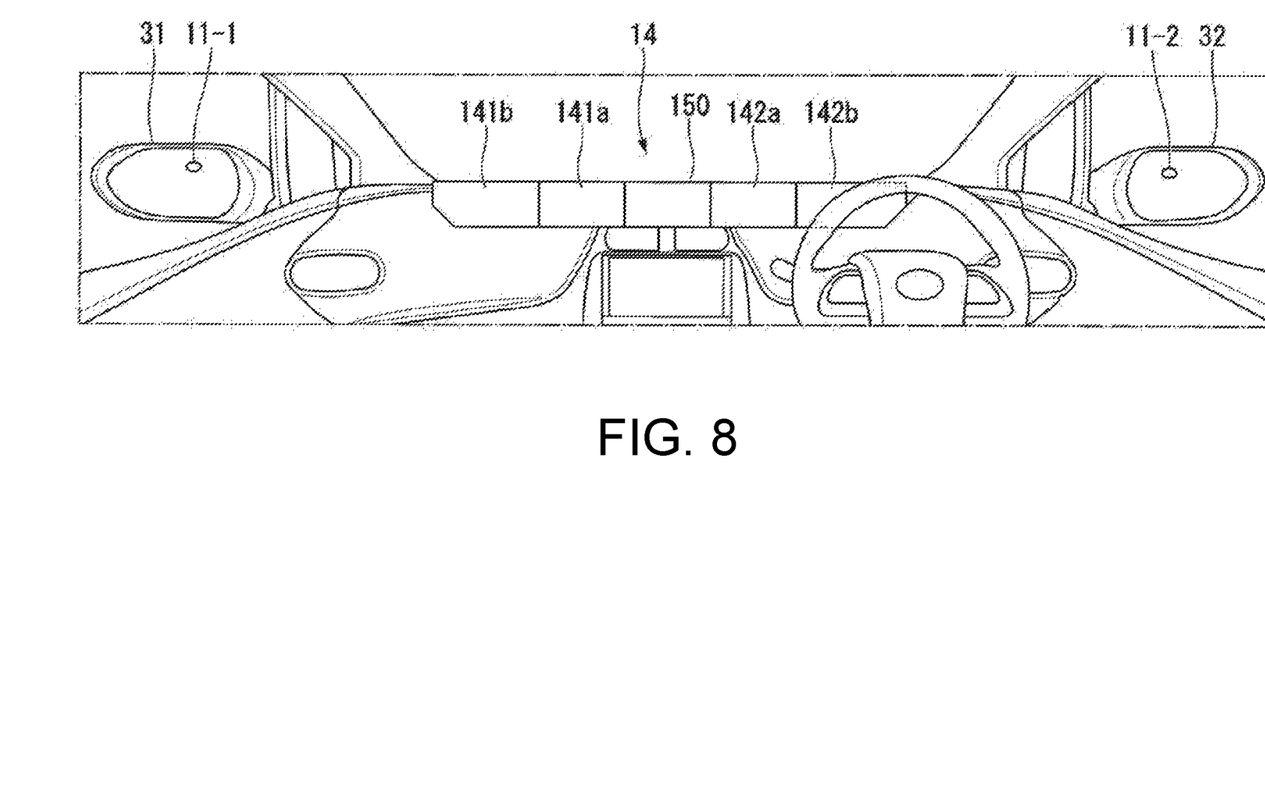
FIG. 8 is a drawing showing an arrangement position of a display device 14 when a vehicle monitor system 1 in the embodiment further includes a rear imaging unit for imaging the rear of the vehicle 30.

In addition, in the above embodiment, the vehicle monitor system 1 may further include a rear imaging unit which images the rear of the vehicle. FIG. 8 is a drawing showing an arrangement position of the display device 14 when the vehicle monitor system 1 further includes the rear imaging unit which images the rear of the vehicle 30.

As shown in FIG. 8, the display device 14 is arranged on the center panel of the vehicle 30. Then, the display device 14 displays images captured by the rear lateral imaging units 11-1, 11-2 and the rear imaging unit so that the images are continuous under the control of the image processor 13. For example, the display device 14 displays, on the display device 14, a panoramic image which is composed of the images captured by the rear lateral imaging units 11-1, 11-2 and the image captured by the rear imaging unit. In this way, the display device 14 which displays an image from the rear of the vehicle 30 to the blind angle of the side mirrors 31, 32 on the rear lateral side of the vehicle 30 is arranged on the center panel, so that indirect view field information can be concentrated in the center panel, and the burden caused by the driver's neck or sight line movement can be reduced. In addition to the center panel, the display device 14 can also be arranged on a meter panel. Furthermore, as long as the front view of the driver is not sacrificed, another monitor may be arranged as the display device 14, and the first display area and the second display area may be used as a back mirror, a front glass, a head-up display and so on. In this way, the front view is not sacrificed, and sight line movement of the driver can be further reduced.

In addition, in the above embodiment, the image processor 13 may inform the driver of the approach of the following vehicle by marking the following vehicle (including a four-wheel vehicle, a two-wheel vehicle, and a bike) in the images captured by the rear lateral imaging units 11-1, 11-2 or the rear imaging unit.

In addition, in the above embodiment, the first and second images may be overlapped partially, or be located in separate areas.

In addition, in the above embodiment, it is shown that the rear lateral imaging unit is provided on the side mirror, but it is not limited thereto, and it can be provided inside or outside the vehicle body. That is, as long as the rear lateral side of the host vehicle which is shown in the first image and the second image can be displayed, the arrangement position of the rear lateral imaging unit is not limited. Besides, with respect to the host vehicle, existence or non-existence of the side mirror is not limited.

In addition, in the above embodiment, the first image may be displayed constantly on the first display area when necessary, and the second image may be selectively displayed on the second display area according to the situation. The moment when the first image is displayed is the moment when the driver is getting in the vehicle, when opening or closing of the vehicle door for the passenger to get on is detected, or when an ignition of the vehicle is turned ON. Besides, after it is detected that the driver gets off the vehicle, the passenger gets off the vehicle, or the ignition is turned OFF, a timer may be activated so as to stop the output to the display unit after a prescribed time.

In addition, in the above embodiment, the wide-angle lens camera is shown, but it is not limited thereto, and the image captured by a camera which can image a necessary angle can also be displayed directly. Besides, the amount of the cameras which are used as the rear lateral imaging unit is not limited, and a prescribed angle range including the first angle and the second angle can be imaged by one camera or a prescribed angle range can be imaged by two or more cameras.

In addition, in the above embodiment, the image with the same viewing angle as the side mirror is displayed on the first display area, but existence or non-existence of the side mirror is not limited here. That is, even for a vehicle on which the side mirror is not mounted, the viewing angle displayed on the first display area can be set to be the same as the viewing angle in a state that the side mirror is hypothetically mounted on the vehicle. Besides, in the first display area and the second display area, the viewing angle can be set arbitrarily. Therefore, in the first display area and the second display area, the displayed viewing angle can be different.

Figure 9:
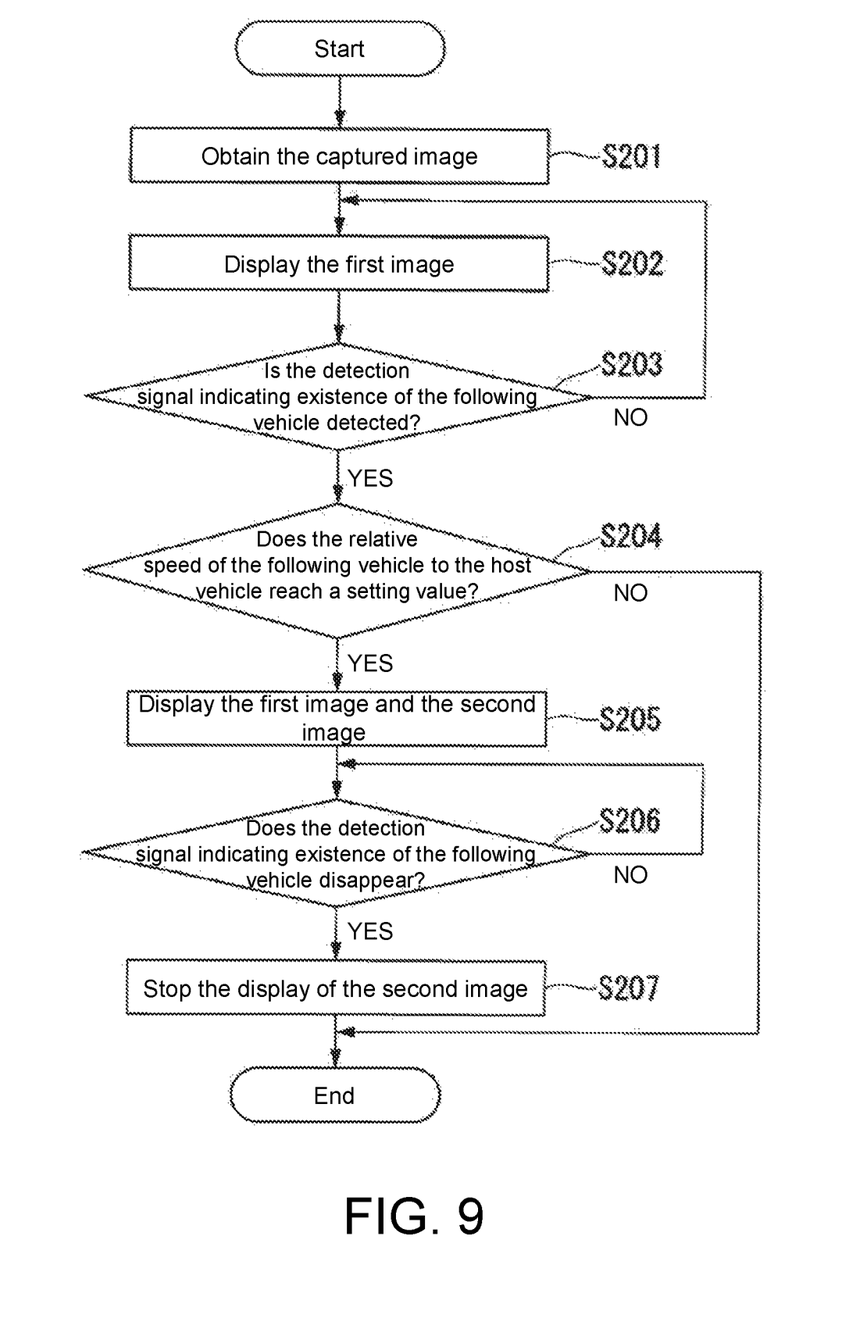
FIG. 9 is a drawing illustrating a processing flow of an image processor 13 in a modification.

In addition, in the above embodiment, the image processor 13 displays the first and second images on the display device 14 according to a relative speed of the following vehicle 100. For example, when the relative speed of the following vehicle 100 with respect to the host vehicle reaches a setting value, the image processor 13 may display the first image and the second image on the display device 14. Accordingly, when the following vehicle stops or when the speed of the following vehicle is slow and there is no hindrance in changing the lane to the safe of the host vehicle, the second image is not displayed. Accordingly, the unnecessary second image can be avoided, and the bother to the driver can be reduced. Furthermore, according to the embodiment, a method for obtaining the relative speed of the following vehicle 100 with respect to the host vehicle is not limited especially. For example, the relative speed can be determined based on a relative distance between the vehicle and an object imaged by the camera, and can also be determined by publicly known technology. A processing flow of the image processor 13 using the relative speed of the following vehicle will be described as modification. FIG. 9 is a drawing illustrating the processing flow of the image processor 13 in the modification. Furthermore, as an initial condition, a case where the following vehicle 100 is not located on the rear lateral side of the vehicle 30 is described as an example.

The image processor 13 obtains the image captured by the rear lateral imaging unit 11 (step S201). The image processor 13 extracts the first image which is an image corresponding to the first angle range from the image captured by the rear lateral imaging unit 11. Then, the image processor 13 displays the first image, which is extracted from the image captured by the rear lateral imaging unit 11, on the display device 14 (step S202). For example, the image processor 13 extracts the first image which is an image corresponding to the first angle range from the image captured by the rear lateral imaging unit 11-1. Then, the image processor 13 displays the first image, which is extracted from the image captured by the rear lateral imaging unit 11-1, on the first display area 141a of the display unit 141. The image processor 13 extracts the first image which is an image corresponding to the first angle range from the image captured by the rear lateral imaging unit 11-2. Then, the image processor 13 displays the first image, which is extracted from the image captured by the rear lateral imaging unit 11-2, on the first display area 142a of the display unit 142. In this case, the image processor 13 may black out the second display area 141b, 142b, make the second display area 141b, 142b blue screen, include the indicator function of informing the driver of the existence of the following vehicle, or display the guidance information such as road traffic information.

The image processor 13 judges whether the detection signal is obtained from the detection unit 10 (step S203). When the detection signal is not obtained from the detection unit 10, the image processor 13 conducts the process of step S202.

When the detection signal is obtained from the detection unit 10, the image processor 13 judges whether the relative speed of the following vehicle with respect to the host vehicle reaches a setting value. When the relative speed of the following vehicle with respect to the host vehicle reaches the setting value, the image processor 13 extracts the first image and the second image which is in the second angle range from the image captured by the rear lateral imaging unit 11, and displays the first and second images on the display device 14 (step S205). On the other hand, when the relative speed of the following vehicle with respect to the host vehicle does not reach the setting value, the image processor 13 does not display the second image or stops displaying the second image.

The image processor 13 judges whether the detection signal output from the detection unit 10 disappears (step S206). When the detection signal output from the detection unit 10 disappears, the image processor 13 stops displaying the second image (step S207). For example, when the detection signal output from the detection unit 10-1 disappears, the image processor 13 stops displaying the second image in the second display area 141*b*, and blacks out the second display area 141*b*, makes the second display area 141*b* blue screen, displays the indicator function, or displays the guidance information such as road traffic information. When the detection signal output from the detection unit 10-2 disappears, the image processor 13 stops displaying the second image in the second display area 142*b*, and blacks out the second display area 142*b*, makes the second display area 142*b* blue screen, displays the indicator function, or displays the guidance information such as road traffic information. Furthermore, when the detection signal output from the detection unit 10-2 does not disappear, the image processor 13 conducts the process of step S206.

The image processor 13 in the above embodiment may be achieved by a computer. In this case, a program for achieving the function may be recorded in a computer-readable recording medium, and the program recorded in the recording medium is read into a computer system and is conducted, thereby achieving the function. Furthermore, the "computer system" referred herein includes an OS or hardware such as peripheral equipment. Besides, the "computer-readable recording medium" refers to a portable medium such as a flexible disk, a magneto-optical disk, a ROM and a CD-ROM, or a hard disk built in the computer system. Furthermore, the "computer-readable recording medium" may also include a recording medium which dynamically keeps the program for a short time like a communication line in a case that the program is transmitted via a network such as Internet or a communication lines such as a phone line, and may include a recording medium which keeps the program in a certain time like a volatility memory inside the computer system serving as a server or a client in this case. Besides, the program may be used to achieve a part of the above functions, may be a program capable of further achieving the above functions by combining with a program already recorded in the computer system, or may be achieved by using a programmable logic device like FPGA (Field Programmable Gate Array).

The embodiments of the present invention have been fully discussed above with reference to the drawings, but a specific configuration is not limited to the embodiment, and designs and so on without deviating from the gist of the present invention are included.

It should be noted that the devices, systems, programs shown in the claims, the specification and the drawings, as well as the operations, procedures, steps, and the conduction sequence of each process of the stages in the method can be achieved arbitrarily as long as it is not explicitly stated as "before", "prior" and the output of the previous process is not used in the subsequent process. Regarding the operation flow in the claims, the specification and the drawings, even if "first", "next" and so on are used for description for the sake of convenience, it does not mean that the operation is definitely executed in this order.

What is claimed is:

1. A vehicle monitor system, comprising:
a radar which detects a vehicle on a rear lateral side of a host vehicle;
a camera which images a prescribed angle range on the rear lateral side of the host vehicle;
a display which is provided inside the host vehicle and displays an image captured by the camera; and
an image processor which extracts a first image in a range of a first angle with reference to a rear side of the host vehicle and a second image in a range of a second angle greater than the first angle with reference to the rear side from the image of the prescribed angle range from the image of the prescribed angle range captured by the camera, and displays the extracted first image and the second image on the display, wherein
the display comprises a first display area for displaying the first image and a second display area for displaying the second image, and
the second display area is located in a direction away from the vehicle with respect to the first display area, wherein
when the vehicle is detected by the radar, the image processor computes a relative speed of the vehicle with respect to the host vehicle, and
when the vehicle is not detected by the radar, or when the relative speed of the vehicle with respect to the host vehicle does not reach a setting value, the image processor displays the first image in the first display area and does not display the second image in the second display area, and wherein
when the relative speed of the vehicle with respect to the host vehicle reaches the setting value, the image processor extracts the first image and the second image, and displays the first image in the first display area and displays the second image on a same scale as the first image in the second display area so as to be continuous with the first image.

2. The vehicle monitor system according to claim 1, wherein
the camera is provided on a side mirror mounted on the host vehicle,
the first angle is a range of a same viewing angle as the side mirror, and
the second angle at least comprises a range of a blind angle of the side mirror.

3. The vehicle monitor system according to claim 1, wherein when the vehicle is detected by the radar, the image processor calculates a relative position of the vehicle with respect to the host vehicle from the image of the prescribed angle range captured by the camera, and determines the second angle based on the calculated relative position.

4. The vehicle monitor system according to claim 1, wherein the display is arranged on a center panel of the host vehicle.

5. The vehicle monitor system according to claim 1, wherein the image processor displays an image of the rear lateral side and an image of the rear side on the display so that the image of the rear lateral side and the image of the rear side are continuous.

\* \* \* \* \*